Nov. 21, 1961 — W. LASAR — 3,009,492
ELECTRIC MEAT CUTTING MACHINE
Filed Jan. 27, 1958
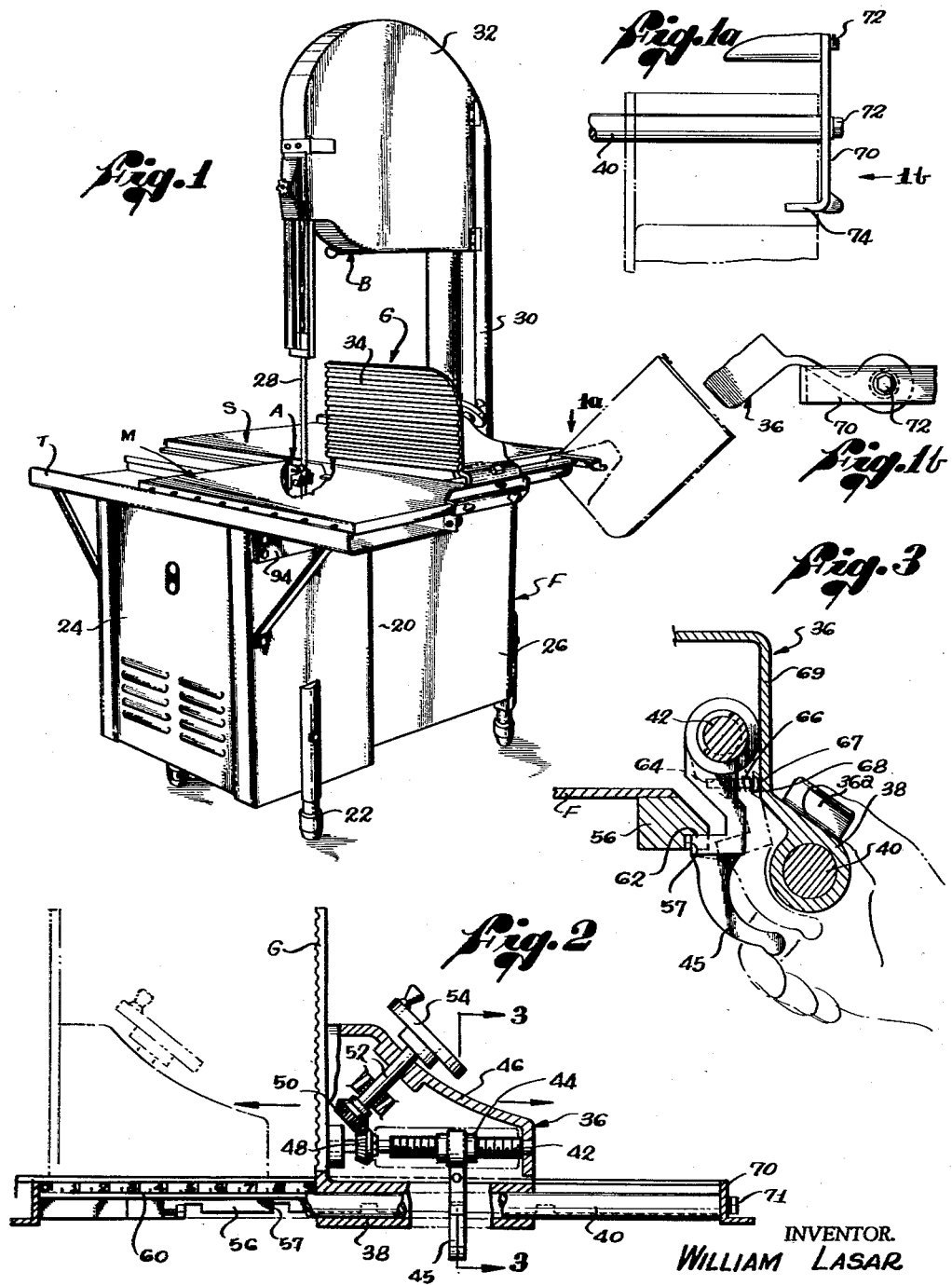
INVENTOR.
WILLIAM LASAR United States Patent Office 3,009,492
Patented Nov. 21, 1961

3,009,492
ELECTRIC MEAT CUTTING MACHINE
William Lasar, 11851 S. Rives, Downey, Calif.
Filed Jan. 27, 1958, Ser. No. 711,321
6 Claims. (Cl. 143—174)

The present invention relates generally to the field of butchering and more particularly to a novel electric meat cutting machine of the band saw type. The band saw type of meat cutting machine is widely used in butchering since it permits rapid and efficient cutting of meat, fish and bone. Such cutting machines generally incorporate a fixed frame, a stationary table, a movable meat-carrying table carried by the frame adjacent the stationary table, and an adjustable thickness gauge which cooperates with an electric motor-driven band saw to slice meat supported upon the two tables.

It is a major object of the present invention to provide a novel and improved device of this nature.

It is a more particular object of the present invention to provide an electric meat cutting machine of the aforedescribed nature having a thickness gauge which may be accurately, quickly and with a minimum expenditure of effort adjusted to the exact thickness of cut desired.

Another object is to provide a device of the aforedescribed nature wherein the thickness gauge is readily movable to a position spaced from the fixed table.

An additional object is to provide a meat cutting machine of the aforedescribed nature which is simple of design and rugged of construction whereby it may afford a long and trouble-free service life.

These and other objects and advantages of the present invention will become apparent from the following detailed description when taken in conjunction with the appended drawings, wherein:

FIGURE 1 is a perspective view of a preferred form of meat cutting machine embodying the present invention;

FIGURE 1a is an enlarged fragmentary top plan view taken from the point designated 1a in FIGURE 1;

FIGURE 1b is a fragmentary end view taken from the point designated 1b in FIGURE 1a;

FIGURE 2 is an enlarged side elevational view, taken partly in vertical section, showing a thickness gauge utilized with said machine; and FIGURE 3 is a vertical sectional view taken on line 3—3 of FIGURE 2.

Referring to the drawings, the preferred form of meat cutting machine embodying the present invention includes a frame F having a base 20 provided with four leveling feet 22. One side of the base defines a hollow housing 24 for an electric motor (not shown), while the other side defines a housing 26 for the lower pulley (not shown) of a band saw blade 28. One side of the lower pulley housing 26 is formed with an upstanding pedestal 30, the upper end of which supports an upper pulley housing 32 for the band saw blade 28. The upper portion of the lower pulley housing 26 supports a stationary meat supporting table S, while the upper portion of the motor housing 24 supports a movable meat supporting table M at the same elevation as table S. The front end of the stationary table 34 supports a thickness gauge G for controlling the width of cut of the meat being sawed. In the general operation of the preferred form of this meat cutting machine, the major portion of a piece of meat to be cut is positioned upon the movable table M with the end to be cut from the main portion of the meat extending onto the stationary table S in abutment with the upstanding gauge plate 34 of the thickness gauge G. The movable table M is then urged rearwardly from its forwardly disposed position of FIGURE 2 so as to cause the saw blade 28 to cut a slice of meat from the main portion thereof. It should be noted that the side of the movable table M adjacent the stationary table S is horizontally spaced from the latter to provide clearance for the band saw blade 28.

Referring now particularly to FIGURES 1 through 3, the thickness gauge G may be of the same general type disclosed in United States Letters Patent No. 2,380,700, issued to me July 31, 1945 and entitled Meat Cutting Machine. This thickness gauge G includes the vertically extending gauge plate 34 which is disposed in parallelism with the direction of movement of the movable table M. The lower front portion of the gauge plate 34 is integral with a hollow body, generally designated 36. The lower front portion of the body 36 is of tubular configuration whereby it defines a hinge 38 that is pivotally supported by a horizontal slide rod 40. The latter is affixed to the frame F forwardly of the stationary table S, and substantially normal to the direction of movement of the movable table M. The body 36 journals a horizontal adjustment screw 42 which is parallel with the slide rod 40. This adjustment screw 42 threadably receives an internally threaded drive sleeve 44. This drive sleeve 44 is internally formed with a depending finger grip 45. As will be clear by reference to FIGURE 2, the left-hand portion of the adjustment screw 42 is of reduced diameter and is keyed to a first beveled gear 48. This beveled gear 48 is meshed with a second beveled gear 50. This second beveled gear 50 is keyed to the lower end of an inclined shaft 52 which is journaled by the body 50 above the adjustment screw 42. The upper end of the shaft 52 extends through the body 50 and is keyed to a hand wheel 54.

As shown in FIGURES 2 and 3, the underside of the stationary table S rearwardly of the slider bar 40 carries an indexing strip 56. This indexing strip 56 is formed at its lower portion with a plurality of longitudinally spaced notches 57. The upwardly-facing surface of the indexing strip 56 is imprinted with numerical indicia 60 representing linear measurements, such as inches and fractions thereof. Preferably, the notches 57 will be aligned with primary numerals of such indicia 60. Referring now particularly to FIGURE 2, the intermediate portion of the finger grip 45 is provided with a locating tongue 62 that is slightly smaller in width than the width of the notches 57. Immediately below the drive sleeve 44 the finger grip 45 is formed with a horizontally extending bore 64. A plunger 66 is slidably disposed within this bore 64 and is constantly biased out of said bore, i.e. forwardly relative to the frame F by a coil compression spring 68 that encircles the portion of the plunger 66 protruding from the bore. The head 67 of the plunger 66 abuts the inner face of the front wall 69 of the aforedescribed body 36. With this arrangement, the finger grip 45 and hence its locating tongue 62 is constantly biased towards the spacer strip 56. The locating tongue 62 may be retracted from the notches 57, however, by merely exerting an upward and forwardly directed force against the lower end of the finger grip 45, as indicated in FIGURE 2. With this arrangement, the operator may readily adjust the approximate position of the thickness gauge G relative to the slider bar 40 by exerting pressure on a thumb handle $36^2$ affixed to the lower portion of the body 36, and after such coarse adjustment has been obtained, the finger grip will be released and the spring 66 will cause the tongue 62 to snap forwardly into a notch 57 so as to lock the thickness gauge G in place relative to the slider bar 40, as will be clear by reference to FIGURE 3.

Once the coarse adjustment of the thickness gauge has been so obtained, the hand wheel 54 may be rotated so as to effect a fine adjustment of the gauge plate 34. In this regard, rotation of the hand wheel 54 will be transferred to the adjustment screw 42 by means of the beveled gears 48 and 50. Since, however, the drive sleeve 44 is locked against movement relative to the slider bar 40, the adjustment screw 42 and hence the body 36 and gauge plate 34 will be moved in a direction parallel with the longitudinal axis of the slider bar 40, as shown in FIGURE 2.

Referring now to FIGURES 1, 1a, 1b, and 2, rest element 70 is affixed to the side of the stationary table S adjacent the slider bar 40, as by bolts 72. The front end of the rest 70 is formed with a hook 74 which extends towards the movable table M. With this arrangement, at such time as the thickness gauge G is urged to the side of the slider bar 40 remote from the movable table M, the gauge plate 34 may be pivoted upwardly and forwardly about the slider bar 40 until the lower front surface of the body 36 rests upon the hook 74, as shown in FIGURES 1, 1a and 1b. With the thickness gauge G disposed in this position, the machine operator has easy access to the remainder of the machine for various purposes. If the operator desires to completey remove the thickness gauge from the frame F, the bolts 72 may be disengaged so as to permit removal of the rest member 70 from the end of the slider bar 40. The hinge 38 of body 36 may then be slid off this end of the slider bar 40. Cleaning or servicing of the thickness gauge G may then be readily accomplished.

It is believed that the operation of the preferred form of meat cutting machine embodying the present invention will be apparent from the foregoing detailed description. When the operator decides upon the thickness of a cut he may first raise the finger grip 45 of the thickness gauge G and move the thickness gauge along the slider bar 40 until he arrives at an approximate or coarse adjustment. The finger grip 45 will then be released and its lock tongue 62 will drop into the nearest notch 57 of the indexing strip 56. Thereafter, the hand wheel 54 will be rotated so as to obtain the exact or fine adjustment. Should the operator desire to move the gauge plate 34 away from the immediate vicinity of the stationary table S he will pivot the thickness gauge G until its body 36 rests upon the hook 74 of the rest 70. The rest 70 may be detached from the frame F so as to permit the entire thickness gauge G to be removed from the frame F for cleaning. During the meat cutting operation, the movable table M will remain freely movable relative to its track T even though the machine operator exerts a side thrust thereon.

From the foregoing description it will be apparent that the electric meat cutting machine of the present invention provides several improvements over heretofore-proposed devices of this nature. It should also be noted that various modifications and changes may be made with respect to the foregoing description without departing from the spirit of the invention or the scope of the following claims.

I claim:

1. In a meat cutting machine having a frame, saw means on said frame, and a table on said frame that is movable relative to said saw means, the combination of: a slider bar attached to said frame normal to the direction of movement of said table; indexing means on said frame formed with a plurality of spaced-apart notches extending parallel with and adjacent to said slider bar; a gauge plate disposed in parallelism to the direction of movement of said table; a body attached to said gauge plate and slidably supported by said slider bar for longitudinal movement therealong; an adjustment screw rotatably supported by said body; a drive sleeve on said adjustment screw; coarse adjustment means carried by said drive sleeve including a locating tongue selectively insertable within said notches for temporarily locking said sleeve against longitudinal movement along said slider bar; a shaft journaled by said body and protruding therethrough; rotation-transfer means interconnecting said shaft and said adjustment screw; and a manually actuated fine adjustment control member secured to said shaft.

2. In a meat cutting machine having a frame, saw means on said frame, and a table on said frame that is movable relative to said saw means, the combination of: a slider bar attached to said frame normal to the direction of movement of said table; indexing means on said frame formed with a plurality of spaced-apart notches extending parallel with and adjacent to said slider bar; a gauge plate disposed in parallelism to the direction of movement of said table; a body attached to said gauge plate and slidably supported by said slider bar for longitudinal movement therealong; an adjustment screw rotatably supported by said body; a drive sleeve on said adjustment screw; coarse adjustment means carried by said drive sleeve including a locating tongue selectively insertable within said notches for temporarily locking said sleeve against longitudinal movement along said slider bar; spring means interposed between said frame and said course adjustment means constantly biasing said locating tongue toward said notches; a shaft journaled by said body and protruding therethrough; rotation-transfer means interconnecting said shaft and said adjustment screw; and a manually actuated fine adjustment control member secured to said shaft.

3. In a meat cutting machine having a frame, saw means on said frame, and a table on said frame that is movable relative to said saw means, the combination of: a slider bar attached to said frame normal to the direction of movement of said table; indexing means on said frame formed with a plurality of spaced-apart notches extending parallel with and adjacent to said slider bar; a gauge plate disposed in parallelism to the direction of movement of said table; a body attached to said gauge plate and slidably supported by said slider bar for longitudinal movement therealong; an adjustment screw rotatably supported by said body; a drive sleeve on said adjustment screw; coarse adjustment means including a finger grip extending from said drive sleeve and being formed with a locating tongue selectively insertable within said notches for temporarily locking said sleeve against longitudinal movement along said slider bar; spring means interposed between said frame and said finger grip biasing said locating tongue towards said notches; a shaft journaled by said body and protruding therethrough; rotation-transfer means interconnecting said shaft and said adjustment screw; and a manually actuated fine adjustment control member secured to said shaft.

4. In a meat cutting machine having a frame, saw means on said frame, and a table on said frame that is movable relative to said saw means, the combination of: a slider bar attached to said frame normal to the direction of movement of said table; a gauge plate disposed in parallelism to the direction of movement of said table; a body attached to said gauge plate and having a tubular hinge slidably and pivotally supported by said slider bar; a rest element removably attached to said frame and extending across said slider bar so as to receive said body when the latter is pivoted away from said frame; an adjustment screw rotatably supported by said body; a drive sleeve on said adjustment screw; coarse adjustment means operatively connected to said drive sleeve for temporarily locking it against movement relative to said slider bar; and manually actuated fine adjustment means for rotating said adjustment screw while said drive sleeve is locked against movement relative to said slider bar.

5. In a meat cutting machine having a frame, saw means on said frame, and a table on said frame that is movable relative to said saw means, the combination of: a slider bar attached to said frame normal to the direction of movement of said table; indexing means on said frame formed with a plurality of spaced-apart notches extending parallel with and adjacent to said slider bar; a gauge plate disposed in parallelism to the direction of movement of said table; a body attached to said gauge plate and having a tubular hinge slidably and pivotally supported by said slider bar; a rest element removably attached to said frame and extending across said slider bar so as to receive said body when the latter is pivoted away from said frame; an adjustment screw rotatably supported by said body; a drive sleeve on said adjustment screw; coarse adjustment means including a finger grip extending from said drive sleeve and being formed with a locating tongue selectively insertable within said notches for temporarily locking said sleeve against longitudinal movement along said slider bar; and a manually actuated fine adjustment control member secured to said shaft.

6. In a meat cutting machine having a frame, saw means on said frame, and a table on said frame that is movable relative to said saw means, the combination of: a slider bar attached to said frame normal to the direction of movement of said table; indexing means on said frame formed with a plurality of spaced apart notches extending parallel with and adjacent to said slider bar; a gauge plate disposed in parallelism to the direction of movement of said table; a body attached to said gauge plate and having a tubular hinge slidably and pivotally supported by said slider bar; a rest element removably attached to said frame and extending across said slider bar so as to receive said body when the latter is pivoted away from said frame; an adjustment screw rotatably supported by said body; a drive sleeve on said adjustment screw; coarse adjustment means including a finger grip extending from said drive sleeve and being formed with a locating tongue selectively insertable within said notches for temporarily locking said sleeve against longitudinal movement along said slider bar; means biasing said locating tongue towards said notches; a shaft journaled by said body and protruding therethrough; rotation-transfer means interconnecting said shaft and said adjustment screw; and a manually actuated fine adjustment control member secured to said shaft.

References Cited in the file of this patent

UNITED STATES PATENTS

| | | |
|---|---|---|
| 1,783,330 | Edwards | Dec. 2, 1930 |
| 1,867,922 | Nelson | July 19, 1932 |
| 2,059,595 | McKeage | Nov. 3, 1936 |
| 2,273,715 | Lonskey et al. | Feb. 17, 1942 |
| 2,280,621 | Biro | Apr. 21, 1942 |
| 2,380,700 | Lasar | July 31, 1945 |
| 2,463,438 | Steiner | Mar. 1, 1949 |
| 2,617,451 | Fink et al. | Nov. 11, 1952 |
| 2,618,300 | Freudenthaler | Nov. 18, 1952 |
| 2,825,369 | Karp et al. | Mar. 4, 1958 |